March 9, 1954
R. K. HUNGERFORD
2,671,529
SYSTEM FOR MAINTAINING THE OIL LEVEL IN THE CRANKCASE OF INTERNAL-COMBUSTION ENGINES
Filed Oct. 24, 1950
2 Sheets-Sheet 1
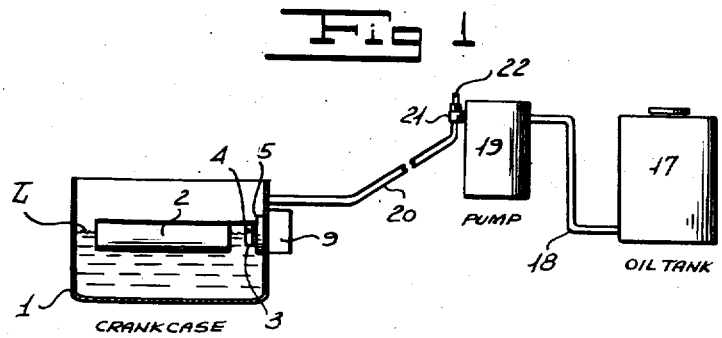
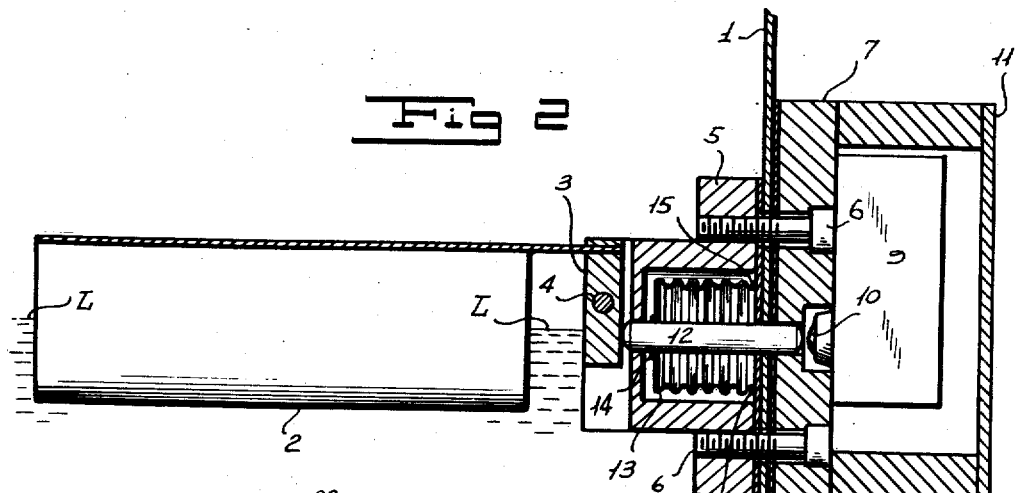
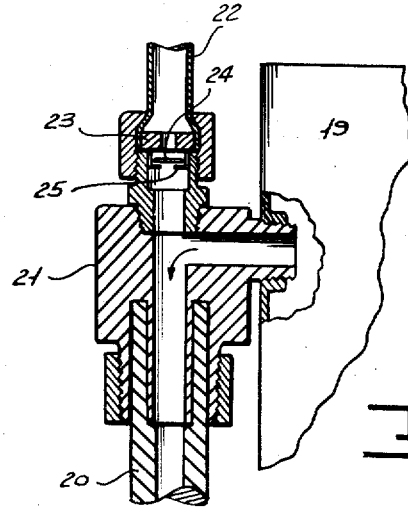
INVENTOR
ROBERT K. HUNGERFORD
BY
Cornelius Zabriskie
ATTORNEY March 9, 1954 R. K. HUNGERFORD 2,671,529
SYSTEM FOR MAINTAINING THE OIL LEVEL IN THE
CRANKCASE OF INTERNAL-COMBUSTION ENGINES
Filed Oct. 24, 1950 2 Sheets-Sheet 2
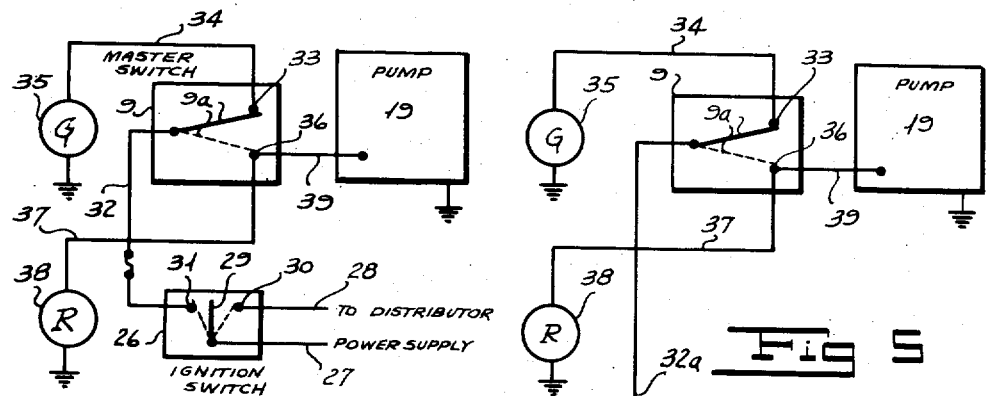
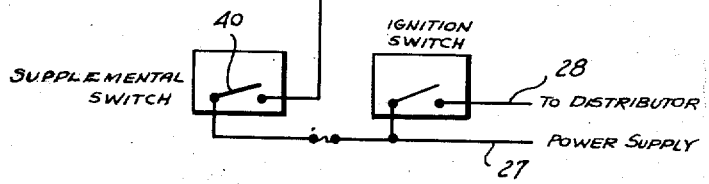
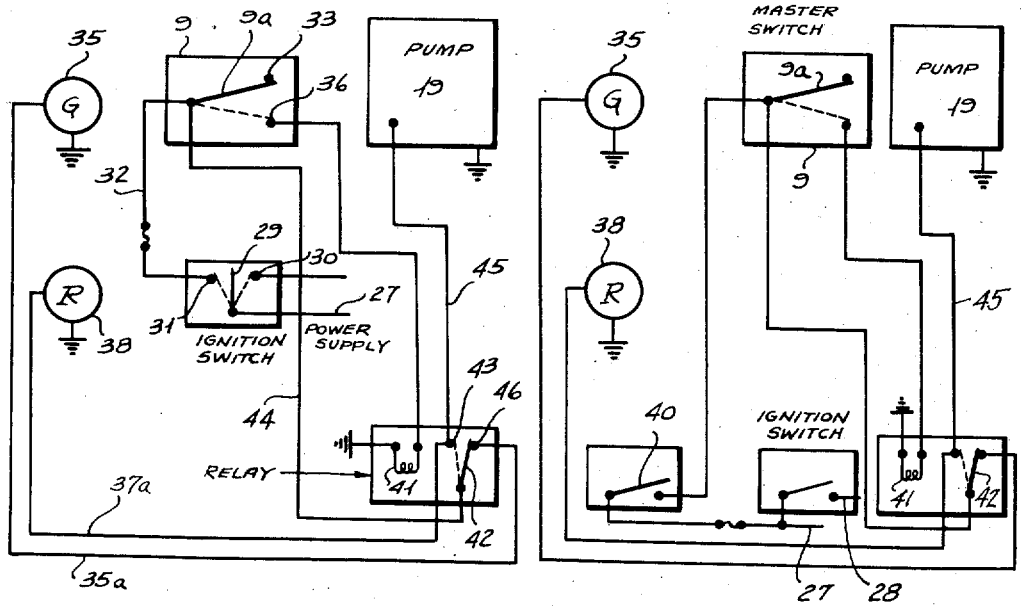
INVENTOR
ROBERT K. HUNGERFORD
BY
Cornelius Zahriskie
ATTORNEY Patented Mar. 9, 1954

2,671,529

UNITED STATES PATENT OFFICE 2,671,529

SYSTEM FOR MAINTAINING THE OIL LEVEL IN THE CRANKCASE OF INTERNAL-COMBUSTION ENGINES

Robert K. Hungerford, West Hartford, Conn.

Application October 24, 1950, Serial No. 191,752

13 Claims. (Cl. 184—103)

This invention is a system for maintaining proper oil level in the crank case of an internal combustion engine and, while adapted for general application, is particularly useful in connection with the engines of automobiles, trucks, buses and trailer tractors.

In practice, owners of large fleets of trucks, buses and other commercial vehicles require a constant check on the crank case oil of such vehicles. Before these vehicles go out on a run, one of a corps of men will check over the oil in each engine. This is done by removing the usual measuring rod, wiping it clean, reinserting it in the crank case, and then withdrawing it again, in order to get a proper reading of the oil conditions. Necessary oil is then introduced and a re-reading is usually taken to be sure that the oil level is correct for that particular engine. These operations are not too burdensome when a few trucks or buses are involved, but when a large fleet of trucks must be checked in this manner, morning and night, the time required for this operation will run into many man hours. There has long been an urgent need for some satisfactory means to eliminate the time and labor thus expended.

Aside from the commercial aspect of this invention, the system thereof is applicable to pleasure cars, automobiles and other vehicles where a person may forget to check the oil level, with resulting serious damage to the engine and such damage may also occur with trucks and buses on long trips on the highway.

The primary object of the invention is to provide for the automatic feed of oil to a crank case when the oil level in such case falls below normal. Attempts have heretofore been made to accomplish this result, but the structures suggested for the purpose have not met with general favor for various reasons. Most of the proposed prior systems feed oil by gravity from an elevated supply tank to a feed chamber outside of the crank case and attempt to maintain the level in the crank case by slight excess in the hydrostatic head in such external chamber. These systems have not worked out satisfactorily. Furthermore most of these prior systems are supposed to feed oil to the crank case while the engine is in operation. Such a feed does not satisfactorily work out in practice.

The present invention overcomes these and other disadvantages of the prior art in a simple and efficient manner. In its preferred practical form, the system of this invention comprises an oil storage tank in which an appreciable body of oil is adapted to be normally contained. This oil is adapted to be fed to the crank case by a pump so that the feed is positive and is not dependent upon gravity. The feed is primarily controlled by a float positioned within the crank case and operable through a liquid impervious joint in the case upon a master electric switch externally of the case. This switch controls the operation of an electric motor for driving the pump, the arrangement being such that the lowering of the oil level in the crank case will close the master switch of the circuit of the pump motor. The motor circuit is, however, provided with a supplemental switch adapted to remain open while the engine is in operation so that oil cannot be fed while the engine is running. When the motor is at rest and this supplemental switch is closed, the motor circuit will be closed if the master switch has been closed because of a low oil level condition in the crank case and consequently oil will be pump fed to the crank case until the normal level has been re-established. The float will then open the master switch and the flow of oil to the engine will be discontinued. With this arrangement, accurate metering of oil feed may be obtained. Moreover the system may be so constituted that the oil is automatically checked each time the engine is stopped, so that there will be no danger of running with the oil too low. The float itself will automatically preclude the feed of too much oil, particularly in connection with certain safety devices hereinafter more fully described.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Figure 1 is a diagrammatic view showing a system embodying the present invention without electrical connections.

Figure 2 is a vertical section through the wall of the crank case showing the float and associated master switch.

Figure 3 shows a fitting interposed between the pump and the crank case to eliminate siphoning of oil from the supply tank into the case when the pump is not running.

Figure 4 is a wiring diagram showing the adaptability of the system to an engine having a three position ignition switch.

Figure 5 shows a diagram similar to Figure 4, but including a two position ignition switch.

Figures 6 and 7 correspond to Figures 4 and 5, but they illustrate a modification of the wiring to incorporate a relay switch in the pump motor circuit and in the pilot light circuit.

Referring to the drawings, 1 designates the crank case of an engine, with its normal oil level indicated at L. Within the crank case is located a float 2 connected to a lever 3 (Fig. 2). This lever is fulcrumed at 4 on a casting 5 secured to the interior of the crank case by stud bolts 6. These stud bolts 6 pass through the base of a housing 7, positioned externally of the crank case, and thread into the casting 5 to mount both the casting and the housing on the crank case with the housing exterior of the latter. A gasket 8 is interposed between the housing 7 and the wall of the crank case. Within the housing 7 is positioned a master switch 9 provided with an operating button 10. A cover 11 normally closes the open side of the housing and protects the switch from accumulations of dirt, oil and other foreign matter.

A plunger 12 extends through the base of the casting 5 and through perforations in the crank case and housing 7, so that one of its ends is adapted for cooperation with a float lever 3 while its other end is positioned to act on a switch button 10. One end of a flexible bellows 13 has a fluid tight connection 14 with the plunger, while the other end of the bellows has a fluid tight connection 15 with a plate 16 interposed between the casting 5 in the crank case wall and tightly clamped therebetween.

The parts are so adjusted that, when the level of the oil is normal as indicated at L in Figure 2, the plunger will be withdrawn from the switch button 10 of the switch 9 of the master switch. To assure such withdrawal, the bellows 13 may be made slightly resilient to retract the plunger and hold it against the float lever 3. With this arrangement the master switch will be open when the oil level is at normal, but will be closed when the float falls below normal, due to recession of the oil level.

An appropriate supply of oil is adapted to be contained in a tank 17 (Fig. 1) to be fed through pipe 18 by a pump 19 which conveys the oil through a flexible hose 20 to the crank case. In some installations it may be convenient to place the oil tank at a higher level than the crank case. In such cases, there may be a tendency for oil to be fed to the engine through the pump by a siphon action after the pump is shut off. In such cases, it is desirable to include in the system an automatically operable air admitting check valve. This structure comprises a fitting, such as shown in Figure 3. This fitting, designated 21, includes an air vent 22 to the atmosphere, having therein a perforated seat 23 beneath which is a flap valve or disk 24. This disk 24 normally gravitates to a support on pins 25 so as to vent the flexible hose 20 to the atmosphere. However, as soon as the pump begins to pump oil through the flexible hose 20, the pressure of this oil will elevate the disk 24 and close the vent. The vent will remain closed so long as oil is pumped through the flexible hose 20 but, as soon as the pumping stops, the disk 24 will fall away from the perforated seat 23 and vent the flexible hose so that the oil cannot siphon from the tank 17 to the crank case. In other words, the oil is fed positively or it is not fed.

The operations of the pump 19 to feed oil to the crank case are primarily controlled by the master switch 9. Different wiring systems for accomplishing this result are shown in Figures 4 to 7, inclusive. The showing of Figure 4 is appropriate to an engine which has a three position ignition switch, such as indicated at 26. Here the power supply leading from the vehicle battery or generator is indicated at 27, while the wire 28 leads to the distributor of the ignition circuit of the engine. When the movable contact 29 of the three position ignition switch is in the neutral position, shown in full lines in Figure 4, the ignition is off, the engine is at rest and the whole electrical system is de-energized.

To operate the engine, the movable element 29 of the switch is engaged with the contact 30 to energize the ignition circuit in the conventional way. However, if the switch is moved from engagement with the contact 30 to stop the engine, and shifted to the left into engagement with the contact 31, it will connect the power supply lead 27 with the movable switch element 9a of the master switch 9. If the oil level in the crank case is normal, the master switch element 9a will be in engagement with the contact 33 and will complete a circuit through a lead 34 to a green pilot lamp 35 to ground. This lamp may be mounted on the instrument panel of the vehicle. As a result, the lamp will be illuminated and the operator will know that oil in the crank case is at normal level. The pilot lamp 35 thus acts as a visual indicator.

If, however, the oil level in the crank case is below normal, the float will have operated the plunger 12 of Figure 2 to move the master switch contact 9a into engagement with the contact 36 in Figure 4 and thus feed electrical energy through the wire 37 to a red pilot lamp 38 also positioned on the instrument board and grounded with respect thereto, thereby giving a visual indication that the oil level is low.

At the same time, current will be fed through a wire 39 to the oil pump 19 with the result that the pump will be energized and will function to pump oil from the tank 17 into the crank case. This feed of oil to the crank case will continue until the float disengages the movable contact 9a from the contact 36. The pump will then stop, the lamp 38 will be extinguished and the contact 9a will reengage with the contact 33, so that the lamp 35 will glow. As soon as the operator sees that this condition prevails, the operator will move the contact 29 of the three position ignition switch into the neutral position shown in Figure 4, leaving the pump at rest, the ignition circuit dead and the vehicle at rest.

When the engine is again put into operation by completing the ignition circuit, as hereinbefore described, the vehicle will function in a normal manner until it is again stopped, whereupon the operator may test the system by moving the contact 29 into engagement with the contact 31 as hereinbefore described. In other words, the mere flick of the ignition switch, when the car is brought to rest, will give a visual indication to the operator of the condition of the oil in the system and if insufficient oil is indicated, he may operate the ignition switch as stated to replenish the oil as described.

The system of Figure 5 is the same as the system of Figure 4, except that in Figure 5 the ignition switch does not have a third contact. It is a single throw switch such as is found on many present day cars and trucks. It is necessary in this particular type of system to incorporate an additional manually controlled supplemental switch 40 which may be an ordinary push button switch. This switch is included in a lead 32a connecting the power supply lead 27 to the movable arm 9a of the master switch 9. When the supplemental switch 40 is manually closed, either of the lamps 35 or 38 will be illuminated and, if the oil level is low, lamp 38 will glow, the pump motor will be energized and will pump oil as in Figure 4.

In systems of Figures 4 and 5, the current for operating the pump passes through the master switch. In some cases, this may not be desirable. Figures 6 and 7 show how the master switch may be utilized to control a relay switch which, in turn, controls the feed of current from the current source to the oil pump motor and to the respective pilot lamps. In these two latter systems, engagement of contact 29 with contact 31, while the contact 9a of the master switch 9 is engaged with the contact 36, will cause current to be fed from the power supply through a magnet or solenoid 41 of the relay. When this magnet or solenoid is energized, it will draw the movable contact 42 of the relay into engagement with a contact 43 of such relay and thus complete a circuit from the power supply through the contact 29 of the ignition switch and wire 32 to a wire 44 to contact 43 and from that contact through wire 45 to the pump which is grounded, thus causing the pump to operate and feed oil into the crank case. At the same time the pilot lamp 38 is energized through lead 37a. As soon as the oil level is restored to normal, the contact 9a will leave contact 36, de-energize the coil 41 and the contact 42, being biased to its full line position, will move into engagement with the contact 46 to break the pump circuit and energize the green pilot lamp 35. At the same time the pilot lamp 38 will be extinguished and lamp 35 energized through lead 35a.

The operations of the system of Figure 7 will be apparent from the description of Figure 6 when it is remembered that the only difference is the use in Figure 7 of a single throw ignition switch and an additional supplemental switch 40.

It will be apparent from the foregoing that the present invention provides for the positive pressure feed of oil to the crank case while the vehicle is at rest for it is only at that time that an accurate metering of the oil to a predetermined level can be obtained. When the vehicle is in motion, the sloshing about of the oil in the crank case makes accurate metering impossible. However, when the vehicle is at rest and the surface of the oil comes to a quiescent level, an accurate feed may be obtained and this the present invention provides.

In each of the foregoing diagrams, there is a switch (contacts 29 and 30, Figs. 4 and 6 and single throw switch Figs. 5 and 7) to control the feed of current from the current source to the distributor of the ignition system and a supplemental switch in series with the master switch to control the oil feed. In Figs. 4 and 6 this supplemental switch is composed of the movable contact 29 and the fixed contact 31 of the conventional three position ignition switch. In Figs. 5 and 7 this supplemental switch is indicated at 40 as a switch structure in addition to the conventional single throw ignition switch. The present invention may thus be readily installed on vehicles with either type of ignition switch, without change of the conventional ignition system.

Through the use of this invention, recourse to the conventional measuring rod is entirely unnecessary. All that is required is that an attendant or operator fill the storage tank 17 from time to time. As long as there is a supply of oil in this tank, the engine may be operated safely from the standpoint of crank case lubrication. All that one has to do is to lift the cover from the tank 17 and pour in oil until the tank is full and then replace the cover. An adequate supply of oil is thereby made available at all times and if the operator will from time to time either press the supplemental switch or turn the ignition switch to the left, as indicated in Figures 4 and 6, there need be no fear of an inadequate oil supply. In addition to the actual operation of the system to feed the oil, the operator can see at a glance the condition of the oil by the illumination of the respective pilot lamps. With the oil pressure feed described, the uncertainties of gravity feed or the dependence upon differential pressures, as has sometimes been tried, is rendered unnecessary as the oil feed of this invention is positive and unfailing in its operation.

It will also be noted that in the system of the present invention, the control of the feed of oil to the crank case may be accomplished from the instrument panel without requiring the driver to leave his seat. The pilot lamps 35 and 38 are also on the instrument panel and can be seen by the driver when in normal driving position.

Experience with the system of this invention has shown that it is particularly critical to relatively small variations in oil level. In other words, a recession in the oil level resulting from the use of a relatively small part of a pint of oil, will bring about an indication of lowered oil level and the feed or replenishing operation is equally as close.

In the foregoing detailed description, I have set forth the invention as particularly adapted for use in connection with the oil level in the crank cases of internal combustion engines. I am aware, however, that it may be adapted to other uses where liquid levels are involved, for example, in connection with large air compressors or anywhere else where liquid levels are to be maintained and it will be convenient or desirable to replenish the level from time to time in a more or less automatic manner.

The foregoing detailed description sets forth the invention in its preferred practical forms, but the invention is to be understood as fully commensurate with the appended claims.

Having thus fully described the invention, what I claim as new and desire to secure by Letters Patent is:

1. A system of the character described comprising: an internal combustion engine having a crank case and an ignition system including a source of electric current and ignition switch, in combination with a float in the crank case responsive to the oil level therein, a master switch operatively connected with the float to be closed by the latter when the oil level recedes below a predetermined elevation, a source of oil supply, a motor operated pump connected to said oil supply and piped to the crank case to pump oil from said source to the crank case when the motor is energized, and electrical connections between said source of electric current and the pump motor and automatically controlled in part by said master switch and additionally manually controlled by a supplemental switch.

2. A system as claimed in claim 1, wherein said supplemental switch is the ignition switch.

3. A system as claimed in claim 1, wherein said supplemental switch is shunted across the ignition switch.

4. A system as claimed in claim 1, wherein the master switch is located externally of the crank case and is operatively connected to the float through an impervious protective seal at the wall of the crank case.

5. A system as claimed in claim 1, wherein the piping connection between the oil supply and the crank case is provided with an automatically operable air admitting check valve to eliminate syphoning of oil from the oil supply to the crank case while the pump is not operating.

6. A system of the character described comprising: an internal combustion engine having a crank case, in combination with a source of oil supply, a pump connected by a conduit to both the source of oil supply and the crank case to pump oil from the former to the latter, and an automatically operable air admitting check valve included in said conduit to eliminate syphoning of oil from said source to the crank case while the pump is not operating.

7. A system of the character described comprising: an internal combustion engine having a crank case and an ignition system including a source of electric current and an ignition switch, in combination with a float in the crank case responsive to the oil level therein, a master switch operatively connected with the float to be closed by the latter when the oil level recedes below a predetermined elevation, a source of oil supply, a motor operated pump connected to said oil supply and piped to the crank case to pump oil from said source to the crank case when the motor is energized, and a motor circuit including the source of electric current, the master switch and the ignition switch and closed by the latter only when the ignition circuit is shut off.

8. A system of the character described comprising: an internal combustion engine having a crank case and an ignition system including a source of electric current and an ignition switch, in combination with a float in the crank case responsive to the oil level therein, a master switch operatively connected with the float to be closed by the latter when the oil level recedes below a predetermined elevation, a source of oil supply, a motor operated pump connected to said oil supply and piped to the crank case to pump oil from said source to the crank case when the motor is energized, a motor circuit including the source of electric current and also the motor and a relay switch, and a controlling circuit including the source of electric current and also the master switch and the ignition switch and energized to close the relay switch to energize the motor when the master switch is closed and the ignition switch is in condition to shut off the ignition and close said controlling circuit.

9. A system of the character described comprising: an internal combustion engine having a crank case and an ignition system including a source of electric current and an ignition switch, in combination with a float in the crank case responsive to the oil level therein, a master switch operatively connected with the float to be closed by the latter when the oil level recedes below a predetermined elevation, a source of oil supply, a motor operated pump connected to said oil supply and piped to the crank case to pump oil from said source to the crank case when the motor is energized, and a motor circuit including the source of electric current, the master switch and a manually operable supplemental switch.

10. A system of the character described comprising: an internal combustion engine having a crank case and an ignition system including a source of electric current and an ignition switch, in combination with a float in the crank case responsive to the oil level therein, a master switch operatively connected with the float to be closed by the latter when the oil level recedes below a predetermined elevation, a source of oil supply, a motor operated pump connected to said oil supply and piped to the crank case to pump oil from said source to the crank case when the motor is energized, a motor circuit including the source of electric current and also the motor and a relay switch, and a controlling circuit including the source of electric current and also the master switch, and a manually operable supplemental switch and energized to close the relay switch to energize the motor when both the master switch and the supplemental switch are closed.

11. A system as claimed in claim 1, including pilot circuit having indicators to respectively indicate the state of the oil level in the crank case when the supplemental switch is closed.

12. A system of the character described comprising: an internal combustion engine having a crank case, in combination with a source of oil supply, a pump connected by a conduit to both the source of oil supply and the crank case, a motor for driving said pump to deliver oil from said source of oil supply to the crank case, an automatically operable air admitting check valve included in said conduit to eliminate syphoning of oil from said source to the crank case while the pump is not operating, an electric circuit including said motor and a master switch, and a float positioned in the crank case for operating the master switch to cause operation of the pump when the oil level in the crank case recedes below a predetermined elevation.

13. A system of the character described comprising: an internal combustion engine having a crank case and an ignition switch, in combination with a source of oil supply, a pump connected by a conduit to both the source of oil supply and the crank case, a motor for driving said pump to deliver oil from said source of oil supply to the crank case, an automatically operable air admitting check valve included in said conduit to eliminate syphoning of oil from said source to the crank case while the pump is not operating, an electric circuit including said motor and a master switch and also the ignition switch of the engine, and a float positioned in the crank case for operating the master switch to cause operation of the pump when the oil level in the crank case recedes below a predetermined elevation.

ROBERT K. HUNGERFORD.

References Cited in the file of this patent

UNITED STATES PATENTS

| Number | Name | Date |
|---|---|---|
| 1,358,741 | Hollis | Nov. 16, 1920 |
| 1,484,641 | Goodwin | Feb. 26, 1924 |
| 1,725,208 | Potter | Aug. 20, 1929 |
| 1,883,202 | White | Oct. 18, 1932 |
| 1,945,317 | Kalin | Jan. 30, 1934 |
| 2,316,000 | James | Apr. 6, 1943 |

FOREIGN PATENTS

| Number | Country | Date |
|---|---|---|
| 222,914 | Germany | June 9, 1910 |